United States Patent
Kotefski et al.

(10) Patent No.: US 10,640,712 B2
(45) Date of Patent: May 5, 2020

(54) METHODS FOR RETRIEVING, RECLAIMING, OR RECYCLING PETROLEUM-BASED PRODUCTS AND BYPRODUCTS

(71) Applicants: Stojan Kotefski, Bloomingdale, NJ (US); Michael Fitzpatrick, Bloomingdale, NJ (US); Kevin Thomas Fitzpatrick, Bloomingdale, NJ (US); Michelle Kotevska, Bloomingdale, NJ (US); Kailey Marie Fitzpatrick, Bloomingdale, NJ (US)

(72) Inventors: Stojan Kotefski, Bloomingdale, NJ (US); Michael Fitzpatrick, Bloomingdale, NJ (US); Kevin Thomas Fitzpatrick, Bloomingdale, NJ (US); Michelle Kotevska, Bloomingdale, NJ (US); Kailey Marie Fitzpatrick, Bloomingdale, NJ (US)

(*) Notice: Subject to any disclaimer, the term of this patent is extended or adjusted under 35 U.S.C. 154(b) by 0 days.

(21) Appl. No.: 15/983,886

(22) Filed: May 18, 2018

(65) Prior Publication Data

US 2018/0334620 A1 Nov. 22, 2018

Related U.S. Application Data

(63) Continuation-in-part of application No. 15/395,298, filed on Dec. 30, 2016, now abandoned, and a
(Continued)

(51) Int. Cl.
*C10C 3/00* (2006.01)
*C10C 3/08* (2006.01)
(Continued)

(52) U.S. Cl.
CPC .......... *C10C 3/007* (2013.01); *B01D 11/0288* (2013.01); *B01D 11/0296* (2013.01);
(Continued)

(58) Field of Classification Search
CPC .......... C10G 1/04; C10G 1/042; C10G 1/045; C10G 21/00; C10G 21/003; C10G 21/006;
(Continued)

(56) References Cited

U.S. PATENT DOCUMENTS 3,856,474 A 12/1974 Pittman et al.
4,222,851 A 9/1980 Good et al.
(Continued)

FOREIGN PATENT DOCUMENTS

WO 8705042 8/1987
WO 2005068080 A1 7/2005
(Continued)

*Primary Examiner* — Prem C Singh
*Assistant Examiner* — Brandi M Doyle
(74) *Attorney, Agent, or Firm* — Samuel A Kassatly (57) ABSTRACT

A method is disclosed for the retrieval and recovery of organic-based or organic-containing materials, including naturally occurring substances such as crude oil, and other petroleum-based or containing materials, natural gas, and the like, from environments where they are entrained within or otherwise admixed or complexed with other organic or inorganic materials, such as rock, sand, shale and the like. The method comprises: retrieving a quantity of the petroleum-containing mixture, treating the petroleum-containing mixture with a solvent for the petroleum material to separate the petroleum material from the mixture, and recovering the separated petroleum-containing material. The solvent may be at approximately ambient temperature and may be, for instance, heptane, hexane, naphtha, kerosene, gasoline or a
(Continued)

petroleum based solvent or any other suitable solvent in which the asphalt binder is soluble.

20 Claims, 4 Drawing Sheets

Related U.S. Application Data continuation-in-part of application No. 15/355,487, filed on Nov. 18, 2016, now abandoned.

(51) Int. Cl.
<table>
<tr><td>C10C 1/14</td><td>(2006.01)</td></tr>
<tr><td>C10C 1/18</td><td>(2006.01)</td></tr>
<tr><td>B09B 3/00</td><td>(2006.01)</td></tr>
<tr><td>B01D 11/02</td><td>(2006.01)</td></tr>
<tr><td>B09C 1/02</td><td>(2006.01)</td></tr>
</table>

(52) U.S. Cl.
CPC .............. *B09B 3/00* (2013.01); *B09B 3/0016* (2013.01); *B09B 3/0083* (2013.01); *C10C 1/14* (2013.01); *C10C 1/18* (2013.01); *C10C 3/08* (2013.01); *B09C 1/02* (2013.01)

(58) Field of Classification Search
CPC ........ C10G 53/04; C10G 53/06; C10C 3/007; C10C 3/08; C10C 1/14; C10C 1/18; B01D 11/00; B09B 3/00; B09B 3/0016; B09B 3/0083; B09C 1/02
See application file for complete search history.

(56) References Cited

U.S. PATENT DOCUMENTS

<table>
<tr><td>4,269,693 A</td><td>5/1981</td><td>Hastie</td><td></td></tr>
<tr><td>4,279,660 A</td><td>7/1981</td><td>Kamo et al.</td><td></td></tr>
<tr><td>5,053,118 A</td><td>10/1991</td><td>Houser</td><td></td></tr>
<tr><td>5,938,130 A</td><td>8/1999</td><td>Zickell</td><td></td></tr>
<tr><td>6,207,044 B1 *</td><td>3/2001</td><td>Brimhall</td><td>B01D 3/06<br>208/14</td></tr>
<tr><td>8,789,773 B2</td><td>7/2014</td><td>Teeter et al.</td><td></td></tr>
<tr><td>2011/0180458 A1 *</td><td>7/2011</td><td>Duyvesteyn</td><td>C10G 1/04<br>208/391</td></tr>
<tr><td>2012/0167802 A1</td><td>7/2012</td><td>Huh</td><td></td></tr>
<tr><td>2013/0240411 A1</td><td>9/2013</td><td>Karsten et al.</td><td></td></tr>
<tr><td>2014/0014000 A1 *</td><td>1/2014</td><td>Franzen</td><td>C08L 95/00<br>106/273.1</td></tr>
<tr><td>2014/0283710 A1</td><td>9/2014</td><td>Kusano</td><td></td></tr>
</table>

FOREIGN PATENT DOCUMENTS

<table>
<tr><td>WO</td><td>2014168477 A1</td><td>10/2014</td></tr>
<tr><td>WO</td><td>2018094315 A1</td><td>7/2018</td></tr>
<tr><td>WO</td><td>2018125952 A1</td><td>7/2018</td></tr>
</table>

* cited by examiner

METHODS FOR RETRIEVING, RECLAIMING, OR RECYCLING PETROLEUM-BASED PRODUCTS AND BYPRODUCTS

CROSS REFERENCE TO RELATED APPLICATIONS

The present application is a Continuation-In-Part of U.S. Non-provisional application Ser. No. 15/355,487, filed Nov. 18, 2016, and U.S. Non-Provisional application Ser. No. 15/395,298, filed Dec. 30, 2016. Applicants claim the benefits of 35 U.S.C. § 120 as to the Non-provisional U.S. applications, and the entire disclosures of both applications are incorporated herein by reference in their entireties.

FIELD OF THE INVENTION

The present invention is in the field of mining, reclamation and recycling. Specifically, the present invention provides methods for retrieving organics, including petroleum products and byproducts, including crude oil, and the recovery and recycling of organics-containing products such as asphalt as well as the resulting recycled materials.

BACKGROUND OF THE INVENTION

The following discussion proceeds with the exemplary petroleum-based material of asphalt, although it is to be understood that other petroleum-based, petroleum-containing and organic materials exist which are either desirous of being recycled or in certain instances, desirous of being mined and abstracted from their native and virgin environment. Accordingly, the present invention contemplates and includes all such petroleum-based, petroleum-containing and other organic materials within its scope.

Asphalt is a universal raw material used for roadways, parking lots and other surface treatments. The asphalt material is generally a composition of minerals including aggregate and sand or stone dust and an asphalt binder. Additionally, novel asphalt mixtures include various substitutes for the aggregate (coarse and fine) including: crushed glass, used tires, and other reclaimed materials. The asphalt binder is basically the glue that binds the mineral or aggregate ingredients such that they are solid under normal operating or environmental temperatures but semi-liquid under elevated temperatures. Another product related to the commonly known term as asphalt is roofing shingles, composed of similar components including aggregate, asphalt binder, and fiberglass.

A typical asphalt composition contains a general ratio of materials as follows: coarse aggregate including crushed minerals or stone having particle sizes in the range from about ⅜ to 1 inch, or 70-85% of volume, fine aggregate including compositions of crushed stone dust, crushed glass, sand or other small sized filler, or 10-20% of volume, asphalt binder, a blend of petroleum refinery product (byproduct) that can be further modified to achieve certain asphalt mixtures or grades, about 10% by volume, and miscellaneous ingredients including trapped air (voids) and moisture. A typical asphalt mixture is the blending of the coarse and fine aggregate with the asphalt binder. However, in the blending process, some trapped air is normally also included. The amount of trapped air and the coating and bonding of the asphalt binder to the aggregate determines the quality and grade of the final asphalt product. As these materials are mixed, the asphalt composition is subjected to elevated temperature (about 300-400° F.) and uniformly mixed such that a uniform blending of components is achieved. This hot mixture is bonded by the phase change of the asphalt binder from a semi-liquid to a solid. As the semi-liquid asphalt binder coats the coarse and fine aggregates, the final asphalt mixture is blended to meet the requirements of the needed final product.

Certain asphalt mixtures are required to meet Department of Transportation specifications based upon application location, environmental and temperature ranges and other requirements. The various grades of asphalt are based upon the aggregate size (coarse and fine), content and percentages of the added components including binder. These asphalt grades created by their respective asphalt binders, screened aggregate particle sizes, compaction forces on the mixture and vibratory rolling to further orientate the final asphalt composition prior to solidification.

As the asphalt is applied to a surface and rolled so that the final flat surface is achieved, other variables are introduced that can affect asphalt quality. These variables or conditions include surface temperatures, asphalt temperatures, application thicknesses and other application variables that may affect the final grade of the asphalt achieved. The asphalt binder applied is a form of thermoplastic that solidifies as the temperature is reduced from the asphalt blending temperature (300-400° F.) to the final product application temperatures (−60 to 160° F.). These temperature ranges affect the temperature change rate or thermal gradient of the solidification process and this affects the final product compaction ratio, density and mechanical properties. The final asphalt product performance factors are based upon these components, the mixture ratios and application methods.

The asphalt binder is phase changed from a solid at ambient temperatures to a semi liquid at elevated temperatures (a plastic state or high viscosity state) that coats the coarse and fine aggregates and fills the voids of the mixture. Aggregate uniformity coating issues occur with the semi liquid asphalt binder because it cannot be thoroughly liquid. After a certain elevation in temperature, the asphalt binder burns or degrades. This asphalt binder aggregate coating capability is an important aspect of achieving higher grade asphalts. It would be desirable to coat the aggregate in an improved manner.

Once an asphalt mixture is applied and rolled onto a desired surface (roadway, parking lot driveway, etc.), the lower temperature of the contact surface changes the asphalt binder back from a semi-liquid state to a solid. This becomes the desired asphalt final product. The coarse and fine aggregate compositions, mixture ratios and asphalt binder blends may further improve the asphalt mixture and final asphalt product properties that may provide an improved life cycle, operating temperature exposure characteristics, weight load bearing properties, surface coefficient of friction characteristics and other desired properties.

The current methods for recycling asphalt typically take certain percentages of "millings" or scrapped/salvaged asphalt from an existing, aged or degraded asphalt surface and blend a small percentage of these millings into a virgin mixture of asphalt (a blend of 25% millings to 75% virgin asphalt is a normal practice). These recycling methods provide a means of recovering small percentages of the "used" or "salvaged" asphalt for recycling back into a new asphalt. As a general rule, approximately 10-30% of millings can remixed with virgin asphalt. This is because the new asphalt mixture is degraded with the addition of aged millings because it does not blend as uniformly as virgin materials. This practice is not allowed in some jurisdictions (approximately 22 States have banned this process) because the new asphalt mixture (with the recycled asphalt content) is inferior. This is likely the result of the aged asphalt having asphalt binder in a crystalline or solid state that cannot phase change or liquefy as the virgin asphalt binder and thus cannot completely blend into the mixture. This yields a lower grade asphalt mixture that has limited use such applications as parking lots and driveways.

Elseifi et al., U.S. Patent Publication 2014/0299018 teach a process for separating constituents of an asphalt-based material including at least asphalt and one solid non-asphalt material by shredding the asphalt-based material to form a shredded material mass. Next, an asphalt binder at an elevated temperature is added to absorb the recoverable asphalt binder from the shredded material. This produces a 30-40% increase in the binder volume, i.e. the recovered binder from the shredded material.

Kotefski et al., U.S. Ser. No. 15/355,487, filed Nov. 18, 2016, the disclosure of which is herein incorporated by reference, teach methods to reclaim or recycle asphalt or asphalt components to produce reusable asphalt or asphalt components by adding the asphalt or asphalt components to a solution at a temperature higher than the melting temperature of the asphalt binder. The solution may be at least 300° F., 325° F., 350° F. or 400° F. or so, and the solution may be an oil or petroleum based solution or any other suitable solution in which the asphalt binder is soluble. In some instances, the solution may be virgin motor oil or recycled motor oil. It is desirable to provide new and improved methods to reclaim or recycle asphalt to produce reusable asphalt and asphalt components. Preferably, reusable asphalt and asphalt components that have the physical properties of virgin asphalt.

It is also desirable to provide further improved methods to reclaim or recycle asphalt or asphalt components to produce reusable asphalt or asphalt components, petroleum-based, petroleum-containing, and organic materials that are either desirous of being recycled or in certain instances, desirous of being mined and abstracted from their native or virgin environment, organic materials, collectively referred to herein as petroleum-based material.

SUMMARY OF THE INVENTION

In a first aspect, the invention provides a method to retrieve, reclaim, or recycle various organic-based or organic-containing materials, including naturally occurring materials such as crude oil, and other petroleum-based and organic materials, manufactured compositions including or containing these materials, including materials such as asphalt or asphalt components, to retrieve such materials from their native origins, or in the instance of manufactured materials such as asphalt, to recycle and thereby produce reusable asphalt or asphalt components that offer quality as close to virgin material as possible. With respect to the naturally occurring or manufactured material, the method of recycling and reuse features:

(a) providing petroleum-based material, such as sand oil, sand tar, shale, or asphalt, and
(b) adding the petroleum-based material to a solvent in which the petroleum-based material is soluble.

In particular, the solvent may be added to a vessel or container and can thereby function as a bath into which the asphalt or the petroleum-based material to be separated and recovered may be placed. The solvent may be provided and used at approximately ambient temperature, for instance, of 50-100° F., or 60-90° F., or 70-80° F. or so. The solvent may be, for instance, heptane, hexane, naphtha, kerosene, gasoline or a petroleum-based solvent or any other suitable solvent in which the petroleum-based material is soluble. The recovered petroleum-based material may be added to the bath and treated to dissolve the asphalt binder or the petroleum-based material as part of the separation and recovery process. A particular non limiting example of equipment that may function as a solvent bath is an automated parts washer or equivalent equipment that can be operated with one or more solvents in which the asphalt binder or the petroleum-based material is soluble. The petroleum-based material may be in a solid state, and the solvent may be provided in a liquid or gaseous state. The materials may be prepared in a first slurry mass that could include solid materials (aggregate coated with residual binder, sands, or rocks coated with petroleum-based material) and a solution of solvent, asphalt binder, or petroleum-based material. The solid materials may be separated via a screening operation while the solution of solvent, asphalt binder, or petroleum-based material can be further treated. This solution may then be further separated to form a reclaimed solvent mass and an asphalt binder mass or petroleum-based material.

The method may further feature crushing the asphalt to be reclaimed or recycled into chunks, millings or particulates prior to step a) above.

The method may further feature c) screening or separating coarse aggregate and fine aggregate asphalt components from the solvent of b).

The method may further feature d) cleaning or removing asphalt binder and/or the solution from the coarse aggregate and fine aggregate asphalt components screened or separated in step c). The cleaning or removing asphalt binder and/or the solution from the coarse aggregate and fine aggregate asphalt components may be performed by evaporation, centrifugal spinning or by adding a second solution effective to remove the asphalt binder and/or the first solution.

The method may further feature e) cleaning or removing asphalt binder from the solution of b). This may also be performed in an automated parts washer. The automated parts washer may be useful for washing and reclaiming the solvent.

The methods may be effective to remove 10%, 20%, 25%, 30%, 40%, 50%, 60%, 75% or more of the asphalt binder from the surfaces of the coarse aggregate or fine aggregate asphalt components.

In a second aspect with respect to asphalt, the invention provides asphalt or an asphalt component reclaimed or recycled according to the methods described herein. The asphalt component may be one or more of a coarse aggregate, a fine aggregate, both including or comprising mineral aggregates, and an asphalt binder. The asphalt binder may be present in, for instance, conventional asphalt, roofing shingles, roofing paper, driveway patch mixes, crack sealers, etc. The reclaimed or recycled asphalt or asphalt component may have the physical properties of virgin asphalt components or may feature binding properties such as binding to an asphalt binder that is superior to the binding properties of virgin asphalt or virgin asphalt components.

The coarse aggregate may include crushed minerals or stones having particle sizes in the range from about ⅛ to 1 inch in diameter. The coarse aggregate may be substantially coated with asphalt binder or substantially coated with a suitable solution in which the asphalt binder is soluble. The coating may be substantially uniform or non-uniform, and the coating may be at a thickness of, for instance, about 1, 2, 3, 4, 5, 10, 25, 50, 100 or 200 μm or more.

The fine aggregate may include compositions of crushed stone dust, crushed glass, sand or other small sized filler material having a diameter of about ¼, or ⅛ or 1/10 or 1/100 inch or less. The fine aggregate may be substantially coated with asphalt binder or substantially coated with a suitable solution in which the asphalt binder is soluble. The coating may be substantially uniform or non-uniform, and the coating may be at a thickness of, for instance, about 1, 2, 3, 4, 5, 10, 25, 50, 100 or 200 μm or more.

The asphalt binder may be a solid at room temperature. The asphalt binder may also be present as a liquid that is dissolved in a suitable solution in which the asphalt binder is soluble.

In a third aspect, the invention provides a reclaimed or recycled asphalt or asphalt component. The asphalt component may be one or more of a coarse aggregate, a fine aggregate and an asphalt binder. The asphalt binder may be present in, for instance, conventional asphalt, roofing shingles, roofing paper, driveway patch mixes, crack sealers, etc. The reclaimed or recycled asphalt or asphalt component may have the physical properties of virgin asphalt or may feature binding properties such as binding to an asphalt binder that is superior to the binding properties of virgin asphalt or virgin asphalt components.

The coarse aggregate may include crushed minerals or stones having particle sizes in the range from about ⅛ to 1 inch in diameter. The coarse aggregate may be substantially coated with asphalt binder or substantially coated with a suitable solution in which the asphalt binder is soluble. The coating may be substantially uniform or non-uniform, and the coating may be at a thickness of, for instance, about 1, 2, 3, 4, 5, 10, 25, 50, 100 or 200 μm or more.

The fine aggregate may include compositions of crushed stone dust, crushed glass, sand or other small sized filler having a diameter of about ¼, or ⅛ or 1/10, or 1/100 inch or less. The fine aggregate may be substantially coated with asphalt binder or substantially coated with a suitable solution in which the asphalt binder is soluble. The coating may be substantially uniform or non-uniform, and the coating may be at a thickness of, for instance, about 1, 2, 3, 4, 5, 10, 25, 50, 100 or 200 μm or more.

The asphalt binder may be a solid at room temperature. The asphalt binder may be present as a liquid that is dissolved in a suitable solution in which the asphalt binder is soluble.

In a fourth aspect, the invention provides a two step integrated method to reclaim or recycle asphalt or asphalt components to produce reusable asphalt or asphalt components using two distinct solvents or solutions for dissolving asphalt binder featuring
  (a) providing crushed asphalt or asphalt components, and
  (b) adding the asphalt or asphalt components to a solution containing a solvent in which the asphalt binder is soluble.

The solution may be at approximately ambient temperature, for instance, 50-100° F., or 60-90° F., or 70-80° F. or so. The solvent may be, for instance, heptane, hexane, naphtha, kerosene, gasoline or a petroleum based solvent or any other suitable solvent in which the asphalt binder is soluble. The solution may be prepared as a bath in an appropriate container, such as a standard automated parts washer or equivalent equipment, to provide exposure to one or more solvents in which the asphalt binder is soluble. The asphalt binder may be in a solid state, and the solvent may be provided in a liquid or gaseous state. As stated above, the materials as initially combined will reside in a first slurry mass, and include solid materials (aggregate coated with residual binder) and solvent/asphalt binder. The solid materials (aggregate coated with residual binder) may be separated via a screening operation while the solvent and asphalt binder can be further treated. The solvent and the asphalt binder in the final asphalt binder-solvent solution may then be further separated to form a reclaimed solvent mass and an asphalt binder mass.

The solvent may be effective to remove 10%, 20%, 25%, 30%, 40%, 50%, 60%, 75% or more of the asphalt binder from the surfaces of the coarse aggregate or fine aggregate asphalt components.

The method may further feature crushing, grinding or breaking the asphalt to be reclaimed or recycled into chunks, millings or particulate prior to step a) above.

The method may further feature c) screening or separating coarse aggregate and fine aggregate asphalt components from the solution of step b).

The method may further feature step d) cleaning or removing asphalt binder and/or the solution from the coarse aggregate and fine aggregate asphalt components screened or separated in step c). The cleaning or removing asphalt binder and/or the solution from the coarse aggregate and fine aggregate asphalt components may be performed by centrifugal spinning or by adding a second solution effective to remove the asphalt binder and/or the first solution.

The method may further feature e) cleaning or removing asphalt binder from the solution of b). This may also be performed in a bath that may be an automated parts washer suitable for using solvents and for separating solvents and the asphalt binder.

The method may further feature f) adding the asphalt components obtained from c) or d) to a solution at a temperature higher than the melting temperature of the asphalt binder.

The solution may be at least 300° F., 325° F., 350° F. or 400° F. or so. The solution may be an oil or petroleum base solution or any other suitable solution in which the asphalt binder is soluble. In some instances, the solution may be virgin motor oil or recycled motor oil.

The solution may be effective to remove 40%, 50%, 60%, 75%, 90% or more of the remaining asphalt binder from the surfaces of the coarse aggregate or fine aggregate asphalt components.

The method may further feature g) screening or separating coarse aggregate and fine aggregate asphalt components from the solution of f).

The method may further feature h) cleaning or removing asphalt binder and/or the solution from the coarse aggregate and fine aggregate asphalt components screened or separated in step g). The cleaning or removing asphalt binder and/or the solution from the coarse aggregate and fine aggregate asphalt components may be performed by centrifugal spinning or by adding a second solvent effective to remove the asphalt binder and/or the first solution.

The method may further feature of step i) cleaning or removing asphalt binder from the solution of step f).

DETAILED DESCRIPTION OF THE INVENTION

The Methods

Figure 1:
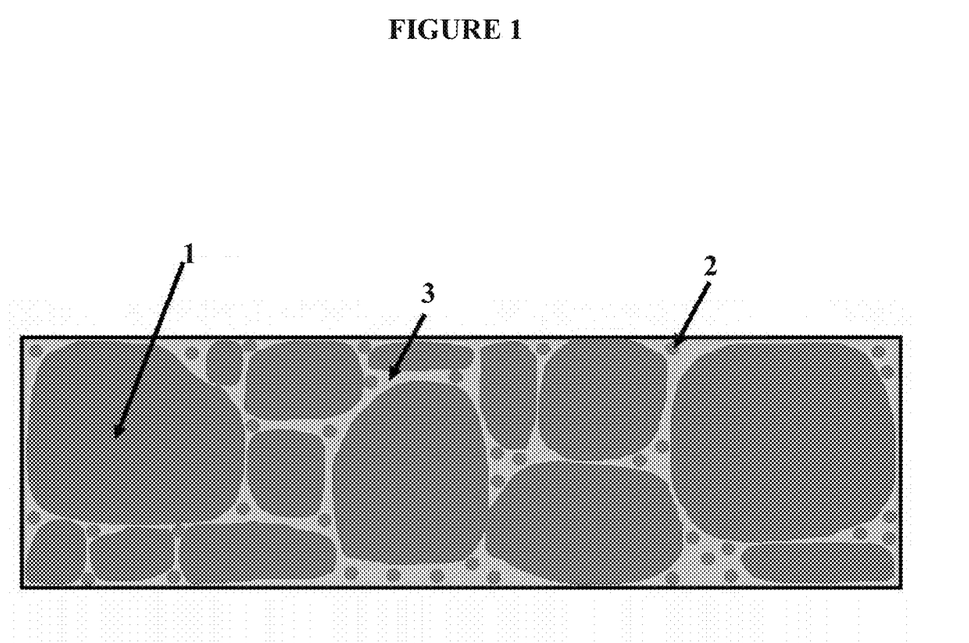
FIG. 1 illustrates a typical cross section of an asphalt mixture showing the coarse or mineral aggregate 1, fine aggregate 2 and asphalt binder 3.
Figure 2:
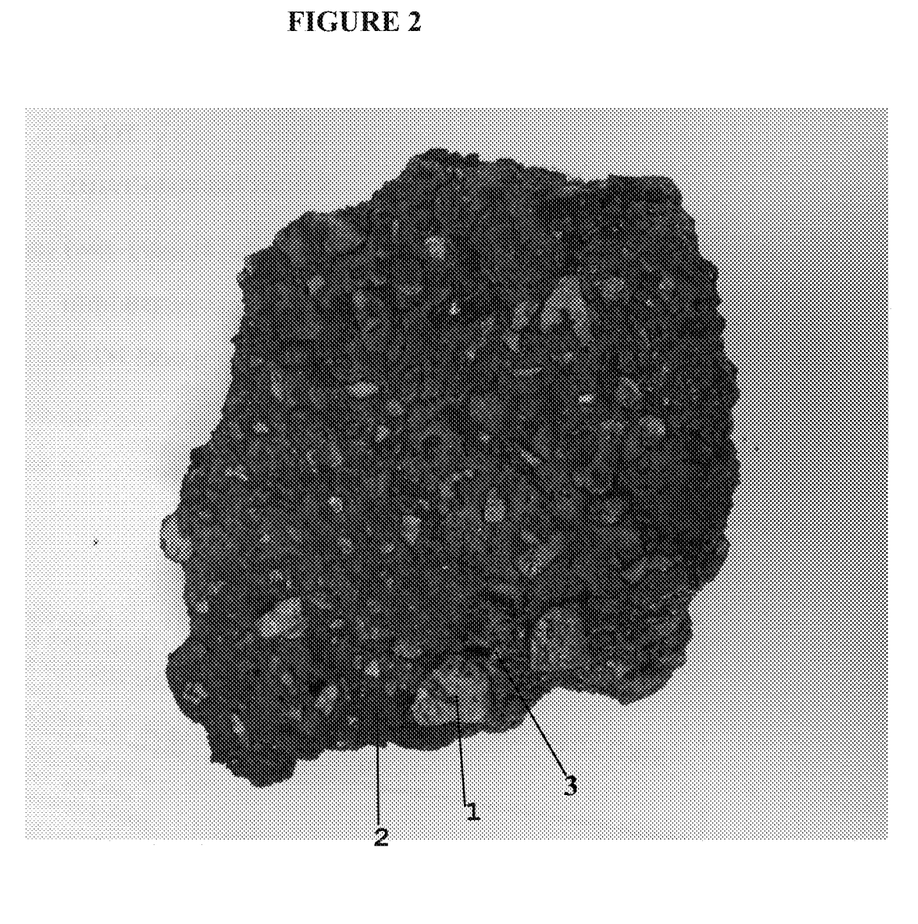
FIG. 2 illustrates a typical chunk of an asphalt mixture containing the coarse or mineral aggregate 1, fine aggregate 2 and asphalt binder 3.
Figure 3:
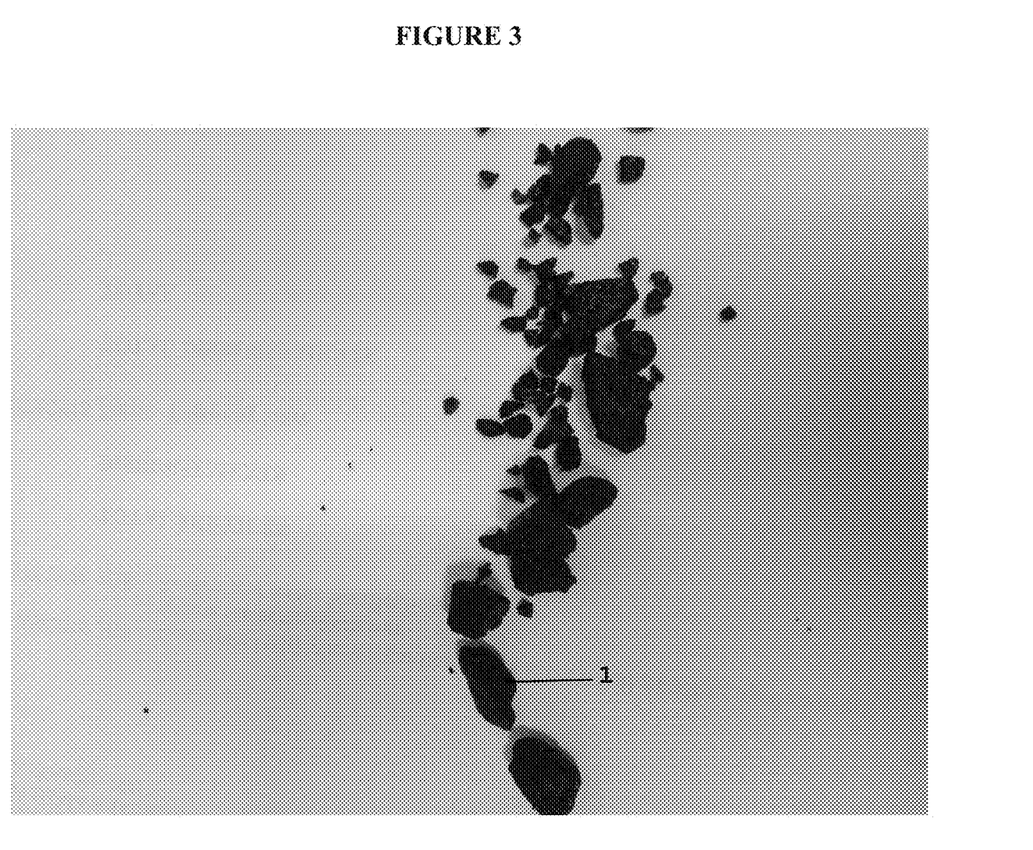
FIG. 3 illustrates the coarse or mineral aggregate 1 coated with solution.
Figure 4:
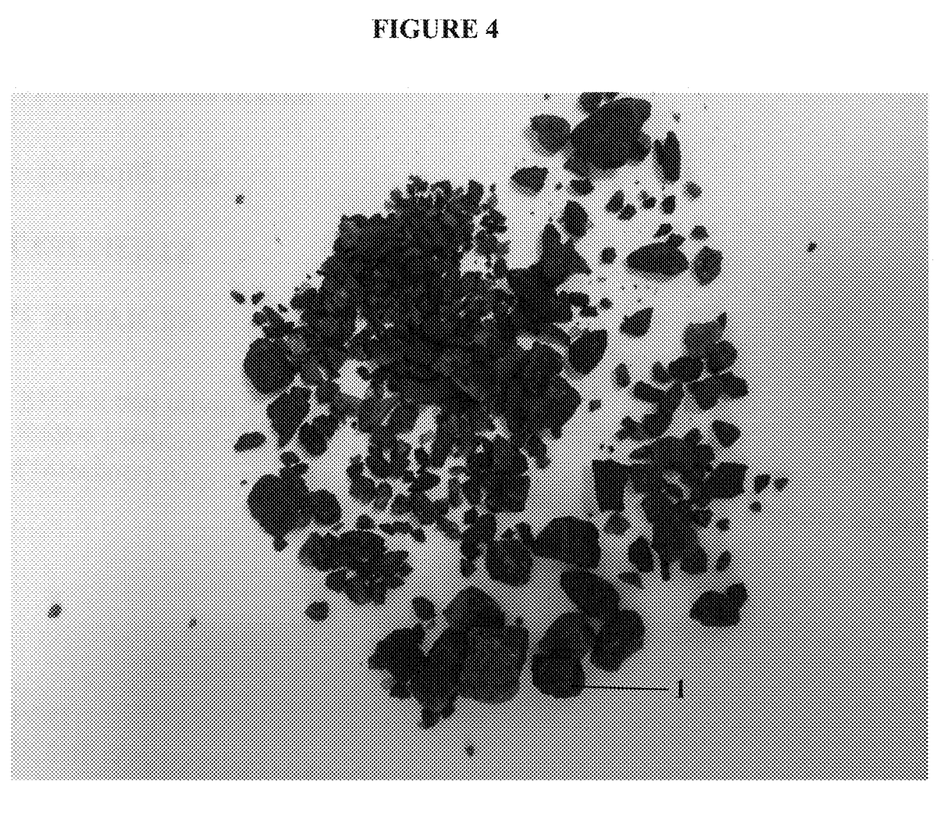
FIG. 4 illustrates the coarse or mineral aggregate 1 substantially free of any coating with asphalt binder.

In a first aspect, the methods of the invention pertain to the retrieval and recovery of organic-based or organic-containing materials, including naturally occurring substances such as crude oil, and other petroleum-based or containing materials, natural gas, and the like, from environments where they are entrained within or otherwise admixed or complexed with other organic or inorganic materials, such as rock, sand, shale and the like. Included herein are sites where such petroleum products have previously been safely stored, and have breached their storage and have infiltrated surrounding soil and formed contaminated deposits or mixtures. In such instance, the methods comprise the following steps:
 (a) retrieving a quantity of the petroleum-containing mixture,
 (b) treating the petroleum-containing mixture with a solvent for the petroleum material to separate the petroleum material from the mixture and
 (c) recovering the petroleum-containing material separated in step (b).

In a second aspect, the methods described pertain to the retrieval, recycling and recovery of manufactured materials or materials already in industrial use and for which reclamation and recycling are desired. This aspect is discussed in the following description with respect to the recycling of asphalt and asphalt components. It is to be understood however, that asphalt is exemplary of manufactured materials for which recycling and reclamation includes the separation of the organic (petroleum-based) component of the product from other inorganic/non-organic) components which may themselves, merit retrieval and recovery. Accordingly, the following description should be considered as having broader applicability not limited to asphalt.

The methods described with respect to this second aspect are also useful for breaking down the asphalt mixture into its individual aggregate composition so that the asphalt binder is mechanically broken thereby exposing the aggregate surface area for a second solvent cleaning procedure. In the industry, this may be equivalent to a mechanical "crushing" operation which breaks the asphalt binder supporting each aggregate particulate in the asphalt. Also, other commercial methods are available for such a "crushing" procedure including various agitation, compression, clamping, vibration and oscillation equipment.

The first solvent cleaning procedure may, for example be performed in an apparatus or by a system designed for the cleaning and separation of organic components from those that are inorganic or non-organic. A non-limiting exemplary such apparatus or system that replicates or performs the solvent cleaning procedure is a standard automated parts washer, such as those offered by PRI (Progressive Recovery, Inc., Dupo, Ill.). Such equipment or equivalent provides exposure to one or more solvents in which the asphalt binder is soluble. The asphalt binder is in a solid state, and the solvent is provided in a liquid or gaseous state. As the solvent disperses about the aggregate surface area, loose, broken edges and other forms of asphalt binder are dissolved into the solvent and a binder/solvent mixture is created. This solvent/binder mixture includes the asphalt binder that is small enough or loose enough to be carried into the binder/solution mixture. The amount of asphalt binder able to dissolve into the solvent is based upon the "crushing" procedure and how much the crushing procedure can break down the asphalt binder bond to the aggregate. The finer the breakdown, the more broken asphalt binder surface area is exposed. In turn, the greater the amount of aggregate surface area exposed, the more the solvent is able to break down the aggregate asphalt binder coated surfaces and loose asphalt binder particulate.

As stated above, the solvent may be provided in a bath or like treatment station, where the retrieved asphalt material may be immersed or otherwise exposed to the solvent cleaning step. Likewise, the treatment station may use an industrial automated parts washer. Such automated parts washers are designed for commodities other than asphalt aggregate such as, for instance, painted parts, degreasing parts, component surface preparations, etc. An automated parts washer may be retrofitted for solvent cleaning of the asphalt after the crushing procedure. In general, the "fluffier" the crushed asphalt aggregate, the more surface area is exposed for the solvent to recover into the asphalt binder/solvent mixture.

In addition to the washing of the aggregate and creating the binder/solvent mixture, the treatment station recycles the solvent via standard or known condensation methods. The residual of the binder/solvent mixture, i.e. the asphalt binder, is recovered as a byproduct of the solvent washing procedure.

Thus, the methods described herein allow separating the asphalt binder from the binder/solvent mixture. This has not previously been performed and provides a novel separation method normally able to extract about 25-50% of the asphalt binder present on the surface of the "asphalt millings." The remainder of the asphalt binder remains as a coating on the asphalt aggregate.

The solvent in the methods described herein is one that degrades or allows the asphalt binder to dissolve into the solvent to create the asphalt binder/solvent mixture. Suitable solvents include, for instance, heptane, hexane, naphtha, kerosene, gasoline and other petroleum based solvents. These are commercially available solvents, and based upon the solvent aggressiveness desired, the solvent can be suitably selected. Heptane is especially suitable as a solvent, and works particularly well in the present methods.

The Products Produced by the Methods

As the asphalt aggregate is treated by the solvent washing procedure, secondary screening operations may separate the aggregate into sized particulates. Each sized particulate may be remixed with a new asphalt mixture to provide improved asphalt mixture physical properties.

Binder Coated Coarse Aggregate.

Large and medium sized aggregate with a significant asphalt binder coating may be obtained. Each large and medium aggregate is coated with the residual asphalt binder that was not removed from the solvent cleaning operation performed in the automated parts washer. Thus, asphalt binder coated aggregate from the used asphalt millings are provided.

Binder Coated Fine Aggregate.

These fine aggregate particulates are of special value in the asphalt industry. They may be used directly in other products such as crack fillers, asphalt repair mixtures, surface texture treatments, etc. These fine aggregates are the sand and stone dust of asphalt. They are the smaller particulate of the aggregate composition and are the most difficult to uniformly coat with asphalt binder. This product was not previously available as a stand-alone commodity.

Thus, the methods described herein provide asphalt binder coated fine aggregate, a new commodity, useful in the asphalt, roofing, surface texture and other applications.

Binder/Solvent or Petroleum-Based Material Sludge from the Automated Parts Washer. As the crushed asphalt or petroleum-based material is washed in the automated parts washer, the residual asphalt binder/solvent sludge or petroleum-based material/solvent sludge is further processed by the automated parts washer. This is a standard solvent washing process in which the solvent is evaporated from the binder/solvent sludge or petroleum-based material/solvent sludge, and the solvent is reclaimed via cooling coils and liquefied for reuse. The remaining binder/solvent mixture component is asphalt binder. The remainder of the petroleum-based material/solvent sludge is petroleum product. Thus, the methods described herein provide for recovering asphalt binder. This asphalt binder may have small traces of the solvent. Hence, the asphalt binder may be further processed to purify the asphalt binder into the desired asphalt binder grade or mixture.

Other Applications for the Methods Described Herein

The methods described herein may also be used for recycling roofing shingles or other products containing petroleum-based or containing compositions such as asphalt or asphalt binder. Used or discarded roofing shingles may be crushed to expose as much surface area of the roofing shingle asphalt binder. Then as with the asphalt or HMA, the solvent wash treatment station containing the solvent solution may be used to break down the asphalt binder and recover it. The remaining scrap material may be further "shredded" and reprocessed to obtain more asphalt binder, or the debris may be sorted into aggregate and fiber glass debris for further reclamation or reuse.

Effects of the Methods Described Herein

The methods described herein enable the removal of all of the fine aggregate and a large portion of the residual asphalt binder from crushed asphalt. Almost 50% of the worst processing features may be removed.

In a particular aspect, the methods described herein may be used as a first step in a two-step method. That is, the methods described herein may be a precursor to the methods described by Kotefski et al., U.S. Ser. No. 15/355,487, filed Nov. 18, 2016, commonly owned and co-pending herewith, the disclosure of which is incorporated herein in its entirety. Kotefski et al. teaches methods to reclaim or recycle asphalt or asphalt components to produce reusable asphalt or asphalt components by adding the asphalt or asphalt components to a solution at a temperature higher than the melting temperature of the asphalt binder. Using the methods described herein makes the combined process 10 to 20 times more effective in terms of energy usage, process foot print, equipment requirements, and overall need for oil and oil removal for reclamation.

Thereby the methods described herein reduce all of the fine aggregate processing needs and allow the second step of the reclaiming or recycling procedure, i.e. the boiling procedure, to only focus on the larger and medium aggregate. Thus, the amount of oil needed to process the large and medium aggregate is reduced by factors of 500% or more. The fine aggregates would fill the hot oil bath tanks and would need fresh oil more often. Additionally, the fine aggregates are worth more as an asphalt coated product than an uncoated product.

By employing the methods described herein in a two-step process with those described in Kotefski et al., U.S. Ser. No. 15/355,487, filed Nov. 18, 2016, the total volume of oil required for the aggregate processing is reduced. Storage, transport and reprocessing at a refinery are eliminated for the fine aggregate components of the asphalt, and this provides a significant process improvement in terms of product cycle time, waste processing, waste control, energy usage and other benefits.

Two Step Integrated Methods for Reclaiming or Recycling Asphalt Using Two Distinct Solvents or Solutions Accordingly, and as just described above, the present methods described herein may be followed by a second procedure including further methods to retrieve, reclaim or recycle materials such as asphalt or asphalt components to produce reusable asphalt or asphalt components described herein including a) adding the asphalt or asphalt components obtained as described herein to a solution at a temperature higher than the melting temperature of the asphalt binder. The solution may be at least 300° F., 325° F., 350° F. or 400° F. or so. The solution may be an oil or petroleum based solution or any other suitable solution in which the asphalt binder is soluble.

An oil-based solution acts as an environmental seal to the asphalt or asphalt components. As the asphalt is submerged in the oil-based solution, the asphalt binder is protected from degradation, burning and contamination. Current methods merely increase the asphalt temperature until the asphalt binder degrades because of the elevated temperature (and not by the dissolving into an oil based solution). This elevated temperature tends to burn the asphalt binder to a degree that it is unusable or it merely degrades it so that there is no possibility of the asphalt binder performing as would a virgin asphalt mixture.

As the millings or reclaimed asphalt is introduced into the oil based solution, the asphalt binder phase changes from solid to liquid and quickly dilutes, mixes or integrates with the oil based solution. Motor oil or an equivalent is especially suitable because the solution can be safely elevated to temperatures over 500° F. Motor oil also has a low volatility potential under elevated temperatures. This potential oil based solutions and/or mixtures thereof may also include; gasoline, kerosene, diesel fuel and many others oil based products. Each oil based solvent has a "flash point" or level of volatility and could ignite or explode. Other non-oil based solutions may also be suitable including, for instance, waxes, low temperature metals, etc.

As the asphalt binder is dissolved into the oil-based solution, the coarse and fine mineral aggregates are in a free state and are separated from the bond of the asphalt binder and the asphalt mixture. With a subsequent separation or screening procedures, the coarse and fine aggregates can be separated and used as raw material for new asphalt mixtures. The separation or screening procedures may be performed at an elevated temperature range because separating the asphalt binder from the aggregates is best and most easily accomplished in a liquid state. Thus, all residual asphalt binder and oil-based solution (compound solution) is able to drip off or can be spun off through a centrifugal spinning operation.

The second procedure or further methods to reclaim or recycle asphalt or asphalt components may also feature b) screening or separating coarse aggregate and fine aggregate asphalt components from the solution of a). The further methods may also feature c) cleaning or removing asphalt binder and/or the solution from the coarse aggregate and fine aggregate asphalt components screened or separated in step b). The cleaning or removing asphalt binder and/or the solution from the coarse aggregate and fine aggregate asphalt components may be performed by centrifugal spinning or by adding a second solution effective to remove the asphalt binder and/or the first solution.

The resultant separated asphalt composition is as follows:
(a) coarse aggregate coated with residual asphalt binder and oil based solution. This constitutes 75% of the asphalt mass and is a valuable commodity in itself. Additionally, recycling this large percentage of the asphalt mixture provides environmental, energy, and equipment benefits.
(b) fine aggregate or sand/stone dust particulate coated with residual asphalt binder and oil based solution. Although this constitutes 10-20% of the total asphalt mixture, this recovered commodity has a higher value per pound than the coarse aggregate. Additionally, a pre-coated and screened fine aggregate has a further added value because it may be used in many other commodities.
(c) asphalt binder dissolved in the oil based solution. Although this solution is sludge, it has various polymer carbon chain molecules and would easily be recycled back into asphalt binder, mixes, roofing tar mixes, roofing shingle base materials, asphalt crack mixtures, driveway sealers, and the like.

The coarse aggregate coated with residual asphalt binder and oil based solution (compound solution) may be cleaned. An added solvent cleaning operation can be applied to the coarse aggregate to remove the residual oil solution and asphalt binder. This coarse aggregate can then be reused in a virgin asphalt mixture and used to produce asphalt that is equivalent to or superior to a virgin asphalt mixture because the reclaimed coarse aggregate has a pre-coated film of asphalt binder mixture thereof and binds better than virgin coarse aggregate. The virgin coarse aggregate is pre-coated with asphalt binder, and is thus a novel asphalt mixture is made that is superior to current mixtures using virgin materials. The pre-coating of the aggregate allows the asphalt binders to develop stronger bonds than the uncoated aggregate.

The coarse aggregate coated with residual asphalt binder and oil based solution may be cleaned by merely spinning off excess residual asphalt binder and oil based solution (in an elevated temperature and liquid state). The spinning procedure removes the residual asphalt binder and oil-based solution material as well as provides a uniformly coated coarse aggregate. In this case, this pre-coated coarse aggregate may prove to bond better to the asphalt binder because it is pre-coated but not dry (it would contain a small amount of the oil base solution. This simplified process may be slightly substandard to the solvent cleaning method but it would still be superior to the current method of using virgin coarse aggregates.

The fine aggregate or crushed glass/sand/stone dust particulate coated with residual asphalt binder and oil based solution may also be cleaned by the coarse aggregate solvent and spinning methods described above for removing excess asphalt binder and residual oil-based solution. A solvent may be used to remove the oil based solution and asphalt binder residual material. In this case it is more important than the coarse aggregate because the size of the fine aggregate may be dust or sand sized, and the excess or residual coating may have a mass that is equivalent or equal to the desired recovered commodity, i.e. sand, dust, crushed glass or other fine aggregate composition. Additional size screening may be performed to further segregate the fine aggregate into desired sizes since certain sizes or consistencies may be more valuable than virgin fine aggregate. A further advantage and benefit of pre-coated fine aggregate may be realized because the fine aggregate provides the primary fill between the coarse aggregate. Their bond is important to the mechanical properties of the resulting asphalt. If the fine aggregate is pre-coated, then better grades of asphalt may be realized. The pre-coated fine aggregate is a by-product of the methods for reclaiming and recycling asphalt described herein.

The fine aggregate coated with residual asphalt binder and oil based solution may be cleaned by merely spinning, as with the coarse aggregate. This too creates a better asphalt mixture because the asphalt binder bond to the fine aggregate is better and more repeatable in terms of bond strength from batch to batch. By having pre-coated fine aggregate, sand and dust particulate, other asphalt related products may be improved as well. For example, asphalt repair mixtures, crack fillers, roofing shingle compositions and various asphalt related products could be impacted. Presently, no pre-coated fine aggregate, sand, dust or crushed glass is available to the industry. The methods for reclaiming and recycling asphalt described herein may provide an improved material to these product lines.

The additional methods for reclaiming and recycling asphalt described herein may also feature d) cleaning or removing asphalt binder from the solution of step a). The asphalt binder dissolves in the oil based solution. The asphalt binder, normally a solid at room temperature, is now a liquid that is dissolved in the oil based solution. There are several options for using this mixture of asphalt binder and oil based solution. First, a screening process may be used to screen the heavy particulate from the oil based solution and reuse the oil based solution for further asphalt reclaiming and recycling. The sludge or residual asphalt binder may then be reclaimed and sent to a petroleum processing facility to break down the residual asphalt binder material and to separate and reconstitute the various petroleum products such as motor oils, asphalt binders, roofing tar and roofing shingle materials. The oil based solution may be screened and reused multiple times by separating the thicker asphalt binder from the oil based solution.

Benefits of the Asphalt Reclamation and Recycling Using the Two Step Integrated Methods The methods described herein recycle each asphalt component including the coarse aggregate, fine aggregate and asphalt binder. Coarse aggregate constitutes 70-80% of asphalt volume. In being able to recover this material, a cost and environmental savings is realized. Coarse aggregate is basically crushed stone of varying sizes. Recovering the coarse aggregate from aged asphalt eliminates the need for new sources of coarse aggregate. The impact of this reclamation and recycling of coarse aggregate provides environmental and cost savings from (a) less need for or near elimination of need for new or virgin coarse aggregate supply, (b) less energy, man power, equipment and land costs required for obtaining the reclaimed versus virgin coarse aggregate, and (c); reduced need for federal, state and local regulation. Similarly, reclaiming or recycling fine aggregate would provide similar savings and improvements. Reclaiming or recycling the asphalt binder is the most challenging but in fact may prove to be the most needed.

The residual "sludge" produced by the methods for asphalt reclamation and recycling described herein is the asphalt binder in the oil based solution. It would likely need to be reclaimed at a petroleum reprocessing facility. On the other hand, oil supplies are dwindling and with potential oil shortages in the near future, the methods for asphalt reclamation and recycling also address potential oil shortages. In fact during recent oil shortages, the asphalt industry experienced potential shortages in asphalt binders (e.g. for roadways, parking facilities, roofing shingles, and tars). The methods for asphalt reclamation and recycling described herein are able to recycle current products and inventories back into a reusable form such that new sources of raw materials such as asphalt binders, asphalt repair mixtures, roofing shingle binders and roofing tars are recyclable to a large extent.

Further Description of the Asphalt Reclamation and Recycling Two Step Integrated Methods The methods for asphalt reclamation and recycling described herein provide a process that separates the main components of asphalt, i.e. coarse aggregate, fine aggregate and asphalt binder in such a way as to be fully recyclable to create an asphalt mixture that is equivalent or superior to virgin asphalt. Current asphalt recycling and reclamation efforts add aged or used asphalt (approx. 10-20%) to virgin asphalt. Such materials and mixtures are not comparable to virgin asphalt because in the asphalt blending, the aged asphalt retains some of its old asphalt binder and does not bond to the virgin asphalt binder in a homogeneous manner. Thus, asphalt product degradation occurs. This degraded form of asphalt may be adequate for driveways and parking lots, but for major uses such as roadways it may not meet performance requirements. Massive research and investigations have been made into this field, and no solutions have been provided previously.

The methods for asphalt reclamation and recycling described herein address this need and provide a way to meet the current best or virgin asphalt performance requirements by reclaiming or recycling aggregate from used asphalt. The methods for asphalt reclamation and recycling described herein are simple, grade the asphalt binder in such a way as not to leave asphalt binder on the coarse and fine aggregates that has crystallized, burned or added other impurities to the aggregates. Hence, the aggregates may be reused in another asphalt mixture. The methods for asphalt reclamation and recycling described herein simply dissolve the asphalt binder into a oil based solution while basically cleaning the aggregate from the asphalt binder.

In terms of volume and weight, more than 90% of an asphalt composition is the coarse and fine aggregates. This makes methods for asphalt reclamation and recycling described herein extremely effective in recovering the basic raw materials needed for future asphalt production. The second procedure or further methods to reclaim or recycle asphalt or asphalt components described herein may be described by the following steps:

1. Provide any asphalt, or chunks, millings or particulate of asphalt. The existing asphalt may be crushed into suitable sized chunks or pieces.

2. Add the asphalt, or chunks, millings or particulate of asphalt to an oil based solution at a melting temperature of the asphalt binder (approximately 350-400° F.). The solution is preferably oil or petroleum based because the asphalt binder is oil based as well.

3. The oil based solution acts as an environmental seal such that the crushed asphalt or chunks, millings or particulate of asphalt introduced into the solution does not "burn" but rather dissolves into the oil based solution. A suitable solution may be, for instance, motor oil.

4. As the crushed asphalt, or chunks, millings or particulate of asphalt is introduced into the oil based solution, the asphalt binder changes phase from a solid to a liquid and quickly mixes or integrates with the oil based solution without damage (burning) to the asphalt binder.

5. As the binder is dissolved into the oil based solution, the coarse and fine mineral aggregates are in a free state or separated from the previous bonded asphalt mixture.

6. Any suitable sequence of screening may be performed so that the coarse and fine aggregates can be separated. This separation may be performed at the elevated temperature since the asphalt binder separation is most effectively performed with the asphalt binder in a liquid state.

7. The resulting separated asphalt composition is as follows;
   a. coarse aggregate coated with residual asphalt binder and oil based solution,
   b. fine aggregate or sand/dust particulate coated with residual asphalt binder and oil based solution,
   c. asphalt binder dissolved in the oil based solution.

Additional Applications.

The present invention extends to a method for separating and recovering respective components of soil, including minerals and "organic" materials, the latter including particular plant life, fermented vegetation, methane and other liquid and gaseous constituents, crude oil deposits, and the like. By way of background pertinent hereto, soils, and in particular those that can be characterized and described as "raw earth" contain and/or consist of a broad spectrum of materials of both organic and inorganic origin. It is likewise desirable to process such raw earth and to separate the noted components, either for collection and use of all such components for particular purposes, or to remove one or more of the components so as to effect the purification of a component for which isolation and recovery, accumulation and purification is desired.

A specific example of material that is desirably retrieved and separated from such a mixture, involves the recovery of petroleum and petroleum byproducts from contaminated soil, and more generally, the recovery of such petroleum and related products from virgin rock formations, such as shale deposits, as well as oil and tar-containing sands. In this embodiment of the method, the raw soil, rock or sand deposits would be subjected to a wash with a solvent such as heptane, after which the organics would be recovered in a solution with the solvent and could thereafter be separated from the solvent, and both the solvent and the solute would be individually recovered.

Correspondingly, the process involving the use of the solvent wash would permit the separation and recovery of the inorganic components of the soil/rock/sand deposits/sites which if desired, could then be further separated as to their constituents and either discarded or collected for specific end uses and applications.

In a further particular example, the method includes the excavation and treatment of sites where ground contamination has developed and is present, such as at the site of installation of oil storage tanks, where leakage of the tank or other contamination of the site has resulted over time. In such instance, the method would comprise the excavation and removal of the storage tank, the treatment of the adjacent ground from the site with a solvent wash, such as that of heptane, to dissolve and recover the organic contaminants, and the subsequent separation of the solvent and the organic contaminants and the purification and retrieval of each.

In a further embodiment of the invention and as set forth above, the present method can be used in the separation and recovery of crude oil from oil-containing underground deposits, such as oil-containing sands and shale oil deposits. Such deposits may be excavated and then treated in accordance with the method of the present invention to separate the petroleum from the mineral deposits in which it is entrained. Likewise, the mineral deposits may be cleansed and isolated for use in other industrial and corresponding applications.

In a still further embodiment of the invention, soil containing both minerals and material known as "organics" may be treated with the same method, to separate the respective components of such soils. Accordingly, the "organics" may be retrieved after the comminution of the soil material so that the organics may be separated and are recovered, for storage or usage in other areas. Likewise, the isolated and separated minerals may be freed from their intermixture and contamination with the other components of the soil sample and retrieved for corresponding usage for such minerals, such as with building construction, retrieval of elements for the formulation of ceramics and metals, and other applications where pure minerals are desired and used. In all such instances of the practice of the present method, the solvent or solvents that are used in the method may be individually separated, recovered and thereby reconstituted for reuse in the practice of the same method.

While certain of the preferred embodiments of the present invention have been described and specifically exemplified above, it is not intended that the invention be limited to such embodiments. Various modifications may be made thereto without departing from the scope and spirit of the present invention, as set forth in the following claims.

From the foregoing description, various modifications and changes in the compositions and methods of this invention will occur to those skilled in the art. All such modifications coming within the scope of the appended claims are intended to be included therein.

All publications, including but not limited to patents and patent applications, cited in this specification are herein incorporated by reference as if each individual publication were specifically and individually indicated to be incorporated by reference herein as though fully set forth.

We claim:

1. A method to remove, retrieve, or recover a petroleum product or a petroleum byproduct from a petroleum-containing mixture, wherein the petroleum-containing mixture is composed of a petroleum-based material or a petroleum-containing material, and an inorganic material or mineral, the method comprising:
    providing the petroleum-containing mixture;
    wherein the petroleum product or petroleum byproduct is contained in any of the petroleum-based material or the petroleum-containing material, and is in a solid state at ambient temperature;
    submerging the petroleum-containing mixture in a liquid oil-based solution that is heated and maintained at a temperature higher than a phase-change or melting temperature of the petroleum product or the petroleum byproduct;
    upon submerging the petroleum-containing mixture in the heated liquid oil-based solution, the heated liquid oil-based solution provides an environmental seal to the petroleum product or petroleum byproduct, so that the environmental seal prevents the sealed petroleum product or petroleum byproduct from degrading or burning, which allows the environmentally sealed petroleum product or petroleum byproduct to achieve phase-change from the solid state to a liquid state; and
    wherein the liquified petroleum product or petroleum byproduct dissolves into the heated liquid oil-based solution, to create a liquid composition of oil-based solution and of petroleum product or petroleum byproduct; and substantially removing, retrieving, or recovering the petroleum product or petroleum byproduct from the petroleum-containing mixture.

2. The method of claim 1, wherein the solid petroleum product or petroleum byproduct is bonded to the inorganic material or mineral contained in the petroleum-containing mixture; and
    wherein as the liquified petroleum product or petroleum byproduct dissolves in the liquid oil-based solution, the inorganic material or mineral becomes separated, in a free state, from the bond of the petroleum product or petroleum byproduct.

3. The method of claim 2, wherein the liquid composition provides a liquid oil-based coating on the separated inorganic material or mineral.

4. The method of claim 3, further including using a solvent to remove the liquid oil-based coating from the inorganic material or mineral.

5. The method of claim 1, further including, prior to submerging the petroleum-containing mixture in the liquid oil-based solution, providing at ambient temperature, a single solvent wash or bath in which the solid state petroleum product or petroleum byproduct dissolves in part.

6. The method of claim 5, wherein the single solvent wash or bath dissolves between 25% to 50% of the solid state petroleum product or petroleum byproduct.

7. The method of claim 6, further including separating or recovering the petroleum product or petroleum byproduct from the solvent.

8. The method of claim 1, wherein the petroleum-containing mixture includes asphalt mixture.

9. The method of claim 8, wherein the asphalt mixture contains any one or more of: roofing shingle; roofing paper; roofing tar; asphalt; used pavement asphalt; asphalt milling; patch mix material; crack sealer material; surface texture material; and petroleum coating.

10. The method of claim 1, wherein the petroleum product or petroleum byproduct that is removed, retrieved, or recovered from the petroleum-containing mixture includes asphalt binder, asphalt, or petroleum.

11. The method of claim 1, wherein removing, retrieving, or recovering the petroleum product or the petroleum byproduct from the petroleum-containing mixture, includes treating a contaminated site.

12. The method of claim 11, wherein treating the contaminated site includes treating any one or more of: an oil spill, a soil contamination, and a hazardous waste spill.

13. The method of claim 11, wherein the petroleum product or petroleum byproduct that is removed, retrieved, or recovered from the contaminated site includes any one or more of: gasoline, kerosene, heating oil, and diesel fuel.

14. The method of claim 1, wherein removing, retrieving, or recovering the petroleum product or the petroleum byproduct from the petroleum-containing mixture, includes treating a natural mixture or deposit.

15. The method of claim 14, wherein the natural mixture or deposit includes any one or more of: oil sand, tar sand, and shale.

16. The method of claim 15, wherein the petroleum product or petroleum byproduct that is removed, retrieved, or recovered from the natural mixture or deposit includes any one or more of: petroleum; oil; and shale oil.

17. The method of claim 1, wherein upon submerging the petroleum-containing mixture in the heated liquid oil-based solution, the heated liquid oil-based solution provides a thermal conductance and heat energy to the petroleum product or petroleum byproduct to provide thermal energy that allows the petroleum product or petroleum byproduct to phase-change from the solid state to the liquid state.

18. The method of claim 1, wherein the petroleum product or petroleum byproduct coats the inorganic material or mineral in the petroleum-containing mixture.

19. The method of claim 7, wherein separating or recovering the petroleum product or petroleum byproduct from the solvent includes using a solvent recovery system.

20. The method of claim 1, wherein the oil-based solution includes any one or more of: virgin motor oil, recycled motor oil, and a petroleum-based liquid that can be safely elevated to temperatures up to 500 degrees Fahrenheit at atmospheric pressure.

* * * * *